United States Patent
Hsu

(10) Patent No.: US 7,564,210 B2
(45) Date of Patent: Jul. 21, 2009

(54) DRIVER FOR AN INFLATABLE ROTATING EXHIBIT

(75) Inventor: Sheng-Hung Hsu, Kaohsiung Hsien (TW)

(73) Assignee: Gemmy Industries Corporation, Coppell, TX (US)

( * ) Notice: Subject to any disclaimer, the term of this patent is extended or adjusted under 35 U.S.C. 154(b) by 295 days.

(21) Appl. No.: 11/783,532

(22) Filed: Apr. 10, 2007

(65) Prior Publication Data

US 2008/0252249 A1    Oct. 16, 2008

(51) Int. Cl.
    *A47B 91/00*      (2006.01)
    *B23Q 5/00*       (2006.01)
    *E21B 3/00*       (2006.01)

(52) U.S. Cl. .................. 318/715; 248/349.1; 173/15; 173/16; 173/216

(58) Field of Classification Search .................. 318/715
See application file for complete search history.

(56) References Cited

U.S. PATENT DOCUMENTS 4,312,199 A * 1/1982 Uyeda ........................ 70/316
5,967,277 A * 10/1999 Walter ....................... 192/43.1
6,035,947 A * 3/2000 Chung ........................ 173/93.5
7,118,507 B2 * 10/2006 Tomita et al. ............... 475/263
2005/0194509 A1 * 9/2005 Tsai et al. ................. 248/349.1

* cited by examiner

*Primary Examiner*—Bentsu Ro
*Assistant Examiner*—Christopher Uhlir
(74) *Attorney, Agent, or Firm*—Hershkovitz & Associates, LLC; Abraham Hershkovitz

(57) ABSTRACT

A driver for an inflatable rotating exhibit is mounted inside an inflatable rotating exhibit having a transparent inflatable body and a rotating body and has a rotating assembly and a reverse-rotation preventer. The rotating assembly connects to and rotates the rotating body, has a synchronous motor. The synchronous motor rotates in a direction and has a shaft. The shaft is driven by the synchronous motor and rotates the rotating body. However, the synchronous motor will reverse its rotation when the rotating body encounters even temporary resistance while rotating. The reverse-rotation preventer applies a resistance when the rotating body rotates in the wrong direction to make the synchronous motor reverse rotation again to the desired direction. So the reverse-rotation preventer ensures that the rotating inflatable exhibit rotates in the desired direction.

6 Claims, 4 Drawing Sheets

DRIVER FOR AN INFLATABLE ROTATING EXHIBIT

BACKGROUND OF THE INVENTION

1. Field of the Invention

The present invention relates to a driver, and more particularly to a driver with a reverse-rotation preventer for an inflatable rotating exhibit to ensure that the inflatable rotating exhibit rotates in an expected direction.

2. Description of the Prior Arts

Conventional inflatable rotating exhibits are usually displayed on shelves or at an entrance to an exhibition to indicate the theme of the exhibition or to function as an attractive advertisement. The inflatable rotating exhibit usually includes a transparent inflatable body, a conventional driver and a rotating body. The transparent inflatable body has a top and a bottom. The conventional driver is mounted inside the inflatable body at the top and has a drive shaft. The rotating body is mounted inside the inflatable body on the shaft and rotates when the driver operates.

Conventional drivers in conventional inflatable rotating exhibits often use conventional synchronous motors as a prime mover. However, conventional synchronous motors reverse when excessive resistance to rotation is applied during operation. Thus, the rotating body will rotate in an unpredictable direction when no reverse-rotation preventer is mounted in the inflatable rotating exhibit.

To overcome the shortcomings, the present invention provides driver with a reverse-rotation preventer for an inflatable rotating inflatable exhibit to mitigate or obviate the aforementioned problems.

SUMMARY OF THE INVENTION

The primary objective of the present invention is to provide driver with a reverse-rotation preventer that keeps a rotating inflatable exhibit rotating in an expected direction.

A driver for an inflatable rotating exhibit in accordance with the present invention is mounted inside an inflatable rotating exhibit having a transparent inflatable body and a rotating body and has a rotating assembly and a reverse-rotation preventer.

The rotating assembly connects to and rotates the rotating body, has a synchronous motor.

The synchronous motor rotates in a direction and has a shaft. The shaft is driven by the synchronous motor and rotates the rotating body. However, the synchronous motor will reverse its rotation when the rotating body encounters even temporary resistance while rotating.

The reverse-rotation preventer applies a resistance when the rotating body rotates in the wrong direction to make the synchronous motor reverse rotation again to the desired direction. So the reverse-rotation preventer ensures that the rotating inflatable exhibit rotates in the desired direction.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
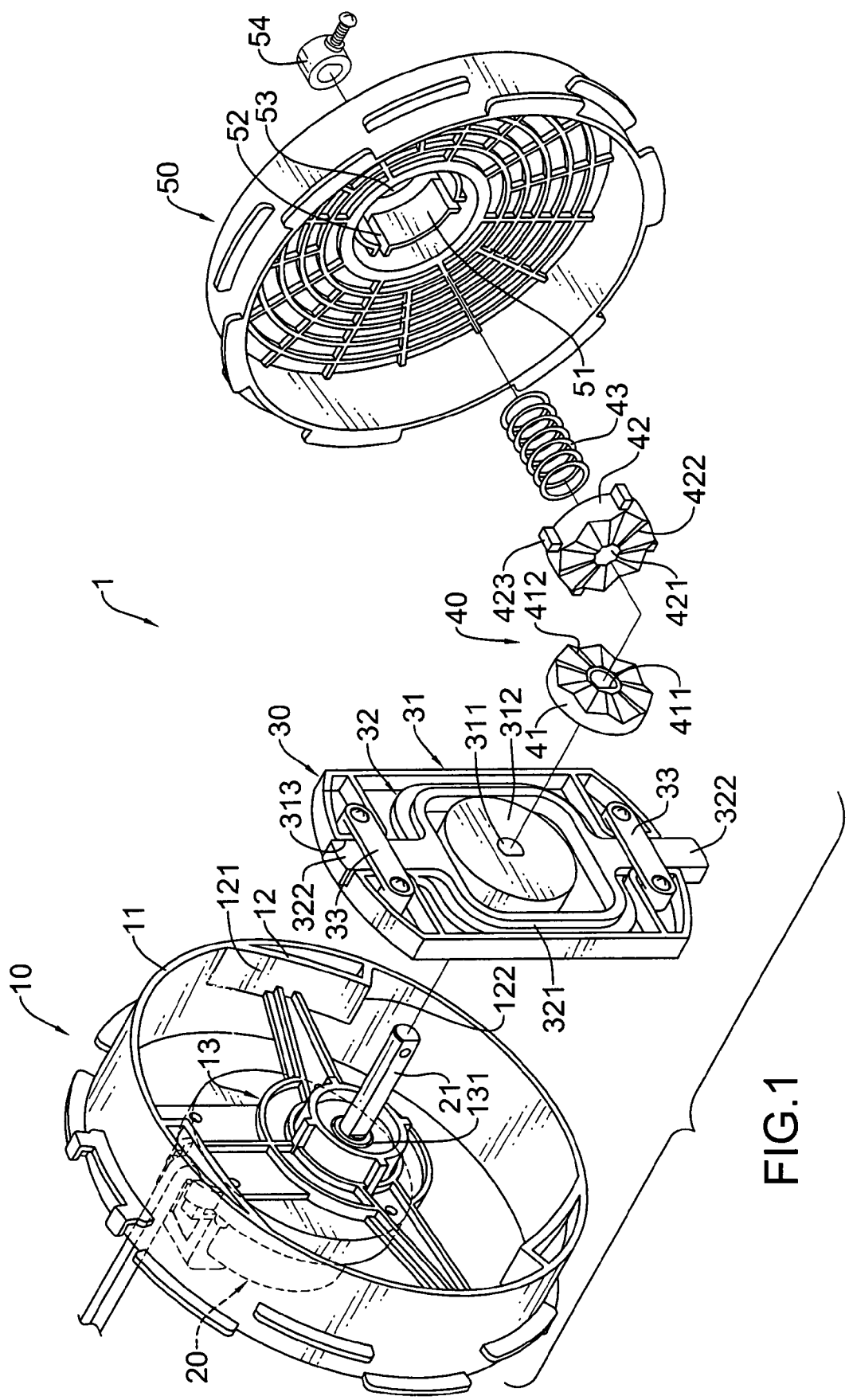
FIG. 1 is an exploded perspective view of a driver for an inflatable rotating exhibit in accordance with the present invention.
Figure 2:
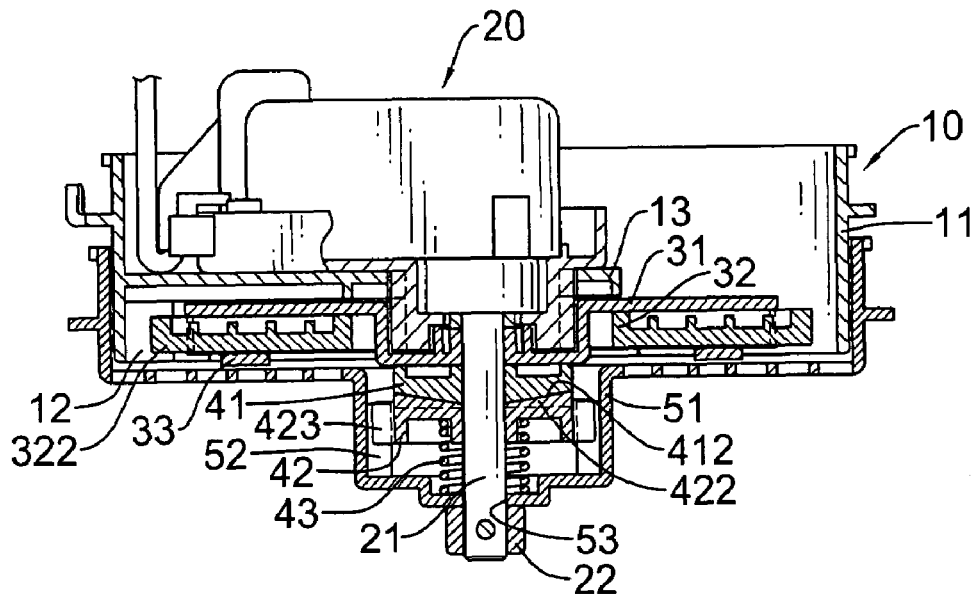
FIG. 2 is a side view in partial section of the driver in FIG. 1.
Figure 4:
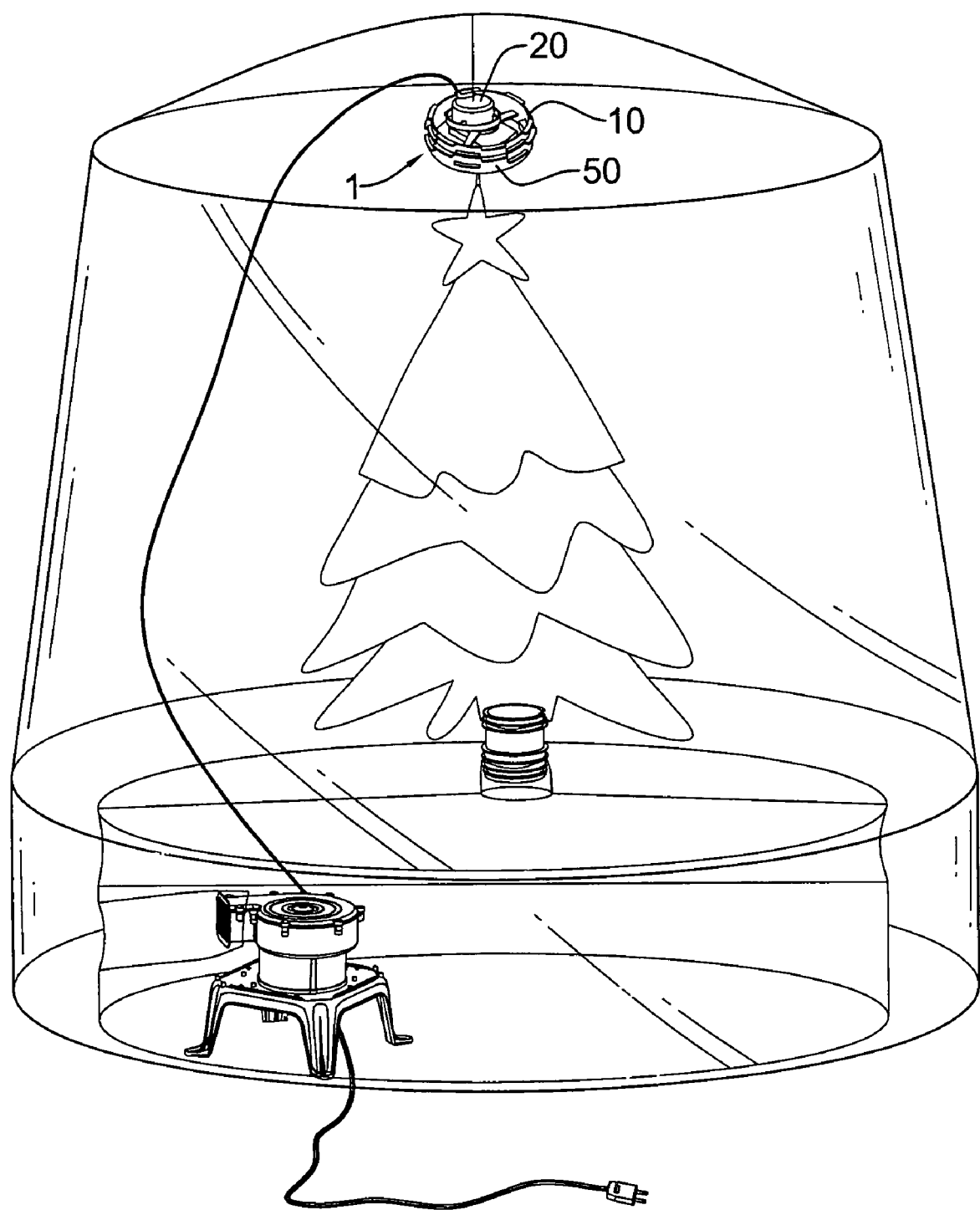
FIG. 4 is a perspective view of a rotating inflatable exhibit with the driver in FIG. 1.

With reference to FIGS. 1, 2 and 4, a driver (1) for a rotating inflatable exhibit in accordance with the present invention comprises a housing (10), a synchronous motor (20), a reverse-rotation preventer (30), a connector (40) and a rotating assembly (50).

The housing (10) is a hollow cylinder and has an annular wall (11), at least one pawl (12) and a motor mount (13).

The annular wall (11) has an inside surface and an outer edge.

The at least one pawl (12) is formed on and protrudes in from the inside surface of the annular wall (11), flushes with the outer edge of the annular wall (11), and each pawl (12) may be implemented with a stop (122) and an inclined surface (121). The stop (122) protrudes in from the inside surface of the annular wall (11) and has a distal edge. The inclined surface (121) may be slightly concave and connects to the distal edge of the stop (122) and the inside surface of the annular wall (11).

The motor mount (13) is connected to the annular wall (11) and has an upper surface and a through hole (131). The through hole (131) is formed coaxially through the motor mount (13).

The synchronous motor (20) is mounted on the upper surface of the motor mount (13) and has a shaft (21). The shaft (21) is keyed, is connected to and driven by the synchronous motor (20), is mounted rotatably through and protrudes from the through hole (131) in the motor mount (13) and has a distal end.

The reverse-rotation preventer (30) is mounted adjacent to the motor mount (13) and has a limit casing (31), a sliding limit (32) and two optional retaining bars (33).

The limit casing (31) is essentially rectangular, is mounted on and rotates with the shaft (21) without contacting the at least one pawl (12) and has a center, a bottom surface, two ends, two sides, a central recess, a central protrusion (312), a keyed hole (311) and two limit slots (313). The central recess is formed in the bottom surface between the two ends and the two sides. The central protrusion (312) is formed in the central recess. The keyed hole (311) is formed through the center of the casing (31) and the central protrusion (312) and corresponds to and is mounted around the shaft (21) so the limit casing (31) rotates with the shaft (21). The limit slots (313) are formed longitudinally respectively in the ends of the limit casing (31) and communicate with the central recess.

Figure 3:
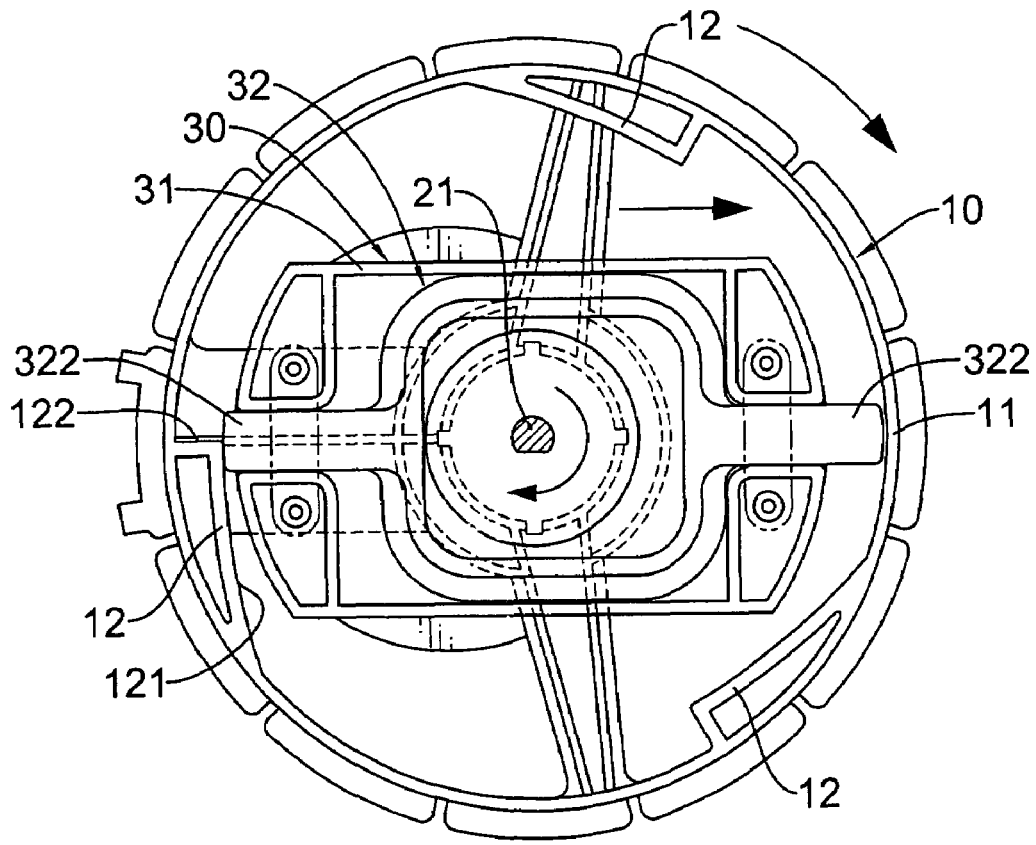
FIG. 3 is an operational bottom view of the driver in FIG. 1 when the driver is operating.
Figure 5:
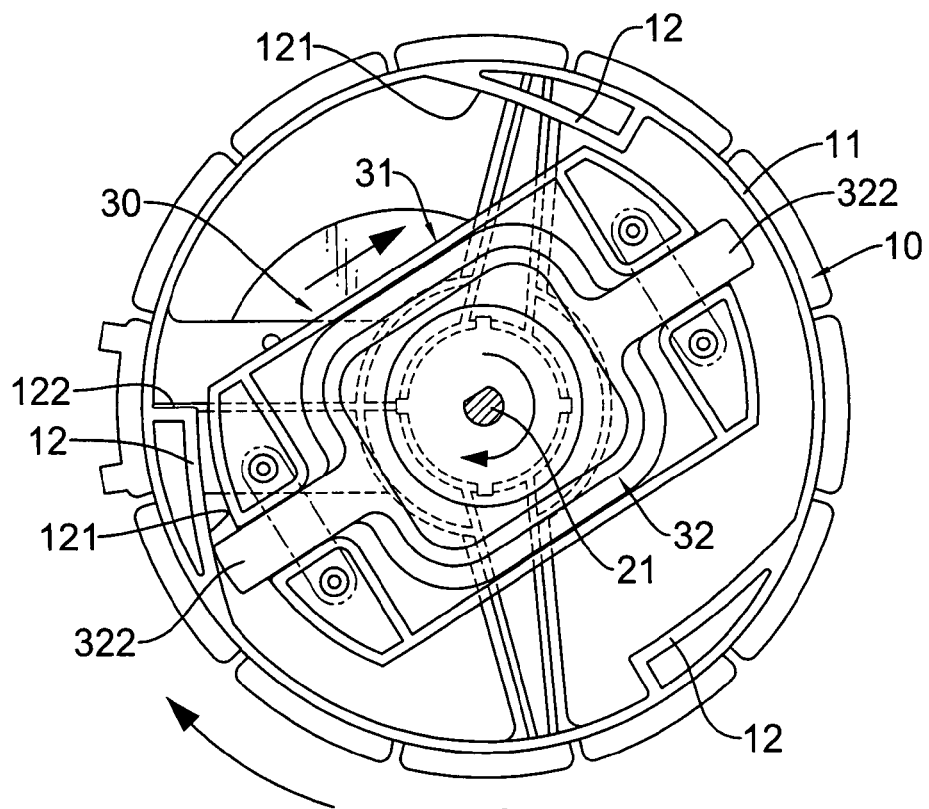
FIG. 5 is an operational bottom view of the driver in FIG. 1 when the driver is rotating in a desired direction.
Figure 6:
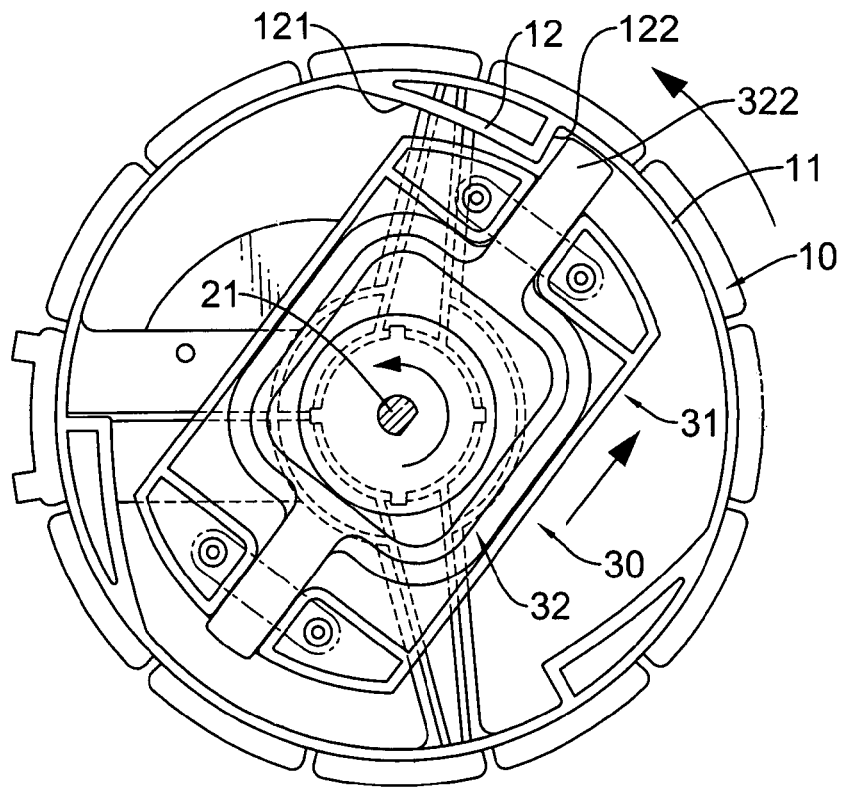
FIG. 6 is an operational bottom view of the driver in FIG. 1 when the driver reverses direction.

With further reference to FIGS. 3 and 5, the sliding limit (32) is mounted slidably in the central recess of the casing (31) around the central protrusion (312) and has a rectangular body (321) and two limit arms (322). The rectangular body (321) has an open center, is mounted slidably in the central recess of the casing (31) around the central protrusion (312) and is limited by touching the central protrusion (312) when sliding in the central recess in the limit casing (31); The limit arms (322) are formed respectively on the rectangular body (321), are mounted slidably respectively in the limit slots (313), are able to extend out of the limit casing (31) with the rectangular body (321) sliding in the limit casing (31) and are alternately pressed into the limit casing (31) by the at least one pawl (12) while rotating in the desired direction. With further reference to FIG. 6, one of the limit arms (322) extending from the rectangular body (321) strikes the stop (122) on a pawl (12) to stop the shaft (21) while rotating in an opposite direction and causes the synchronous motor (20) to reverse and rotate in the desired direction.

The retaining bars (33) are mounted transversely respectively across the limit slots (313) to hold the limit arms (322) in the limit slots (313).

The connector (40) is connected to the shaft (21) adjacent to the reverse-rotation preventer (30), rotates with the shaft (21), may be implemented as an overload clutch and has a proximal end and a distal end.

The overload clutch slips to allow the shaft (21) to rotate in the desired direction when a resistance is applied to the rotating object in the rotating inflatable exhibit and comprises a flywheel (41), a clutch plate (42) and a spring (43).

The flywheel (41) is formed on the proximal end of the connector adjacent to the central protrusion (312) and has a distal end, a through hole (411) and a contact surface (412). The through hole (411) is formed coaxially through the flywheel (41), is keyed, corresponds to the shaft (21) and is mounted securely around the shaft (21). The contact surface (412) is formed on the distal end of the flywheel (41) and has multiple obtuse teeth. The obtuse teeth are formed on the contact surface (412) radially around the through hole (411) and protrude slightly from the contact surface (412).

The clutch plate (42) is mounted rotatably around the shaft (21) adjacent to the flywheel (41), abuts and engages the flywheel (41) and has a proximal end, a distal end, a through hole (421), a contact surface (422) and multiple guide rails (423). The through hole (421) is circular, is formed coaxially through the clutch plate (41) and is mounted rotatably around the shaft (21). The contact surface (422) is formed on the proximal end of the clutch plate (42), corresponds to, abuts and engages the contact surface (412) on the flywheel (41) and has multiple obtuse teeth. The obtuse teeth are formed on the contact surface (422) radially around the through hole (421), protrude slightly from the contact surface (422) and engage the obtuse teeth on the contact surface (412) of the flywheel (41). However, the obtuse teeth on the flywheel (41) and clutch plate (42) slip and allow the shaft to continue turning when excessive resistance is applied to the clutch plate (42). The guide rails (423) are formed longitudinally around and protrude radially from the clutch plate (42).

The spring (43) is mounted around the shaft (21) against the distal end of the clutch plate (42), presses the clutch plate (42) against the flywheel (41) and has an inner end and an outer end. The inner end abuts the distal end of the clutch plate (42).

The rotating assembly (50) is cylindrical, is mounted rotatably on the housing (10), is connected to the connector (40) and has an open top end, a closed bottom end, an optional recess (51), multiple optional guide slots (52), a through hole (53) and a retaining ring (54).

The open top end is mounted rotatably around the annular wall (11) of the housing (10).

The closed bottom end is connected to the connector (40).

The recess (51) is formed concentrically in the closed bottom end of the rotating assembly (50), is mounted around the shaft (21), the clutch plate (42) and the spring (43), abuts the outer end of the spring (43) and has a sidewall and a bottom surface. The bottom surface of the recess (51) abuts the outer end of the spring (43) to press the clutch plate (42) against the flywheel (41).

The guide slots (52) are formed longitudinally in the sidewall of the recess (51) and correspond respectively to and slidably hold the guide rails (423) to connect the overload clutch to the rotating assembly (50).

The through hole (53) is formed coaxially through the closed bottom end of the rotating assembly (50) and is mounted rotatably around the shaft (21).

The retaining ring (54) is attached securely to the distal end of the shaft (21) rotatably against the closed bottom end of the rotating assembly (50) and may be a collar and a setscrew or the like.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A driver for an inflatable rotating exhibit product comprising
    a housing being a hollow, and having
        an annular wall having
            an inside surface; and
            an outer edge;
        at least one pawl being formed on and protruding in from the inside surface of the annular wall and being flush with the outer edge of the annular wall; and
        a motor mount being connected to the annular wall and having
            an upper surface; and
            a through hole being formed coaxially through the motor mount;
    a synchronous motor being mounted on the upper surface of the motor mount and having a shaft being keyed, being connected to and driven by the synchronous motor; being mounted rotatably through and protruding from the through hole in the motor mount and having a distal end; and
    a reverse-rotation preventer being mounted adjacent to the motor mount and having
        a limit casing being essentially rectangular, being mounted on and rotating with the shaft and having
            a center;
            a bottom surface;
            two ends;
    two sides
            a central recess being formed in the bottom surface between the two ends and the two sides;
            a central protrusion being formed in the central recess;
            a keyed hole being formed through the center of the casing and the central protrusion and being mounted around the shaft so the limit casing rotates with the shaft; and
            two limit slots being formed longitudinally respectively in the ends of the limit casing and communicating with the central recess;
        a sliding limit being mounted slidably in the central recess of the casing around the central protrusion and having
            a body having an open center, being mounted slidably in the central recess of the casing around the central protrusion and being limited by touching the central protrusion when sliding in the central recess in the limit casing; and two limit arms being formed respectively on the body, being mounted slidably respectively in the limit slots, being able to extend out of the limit casing with the body sliding in the limit casing and being alternately pressed into the limit casing by the at least one pawl while rotating in a desired direction; one of the limit arms extending from the body striking the pawl while rotating in an opposite direction;

a connector being connected to the shaft adjacent to the reverse-rotation preventer, rotating with the shaft and having
  a proximal end; and
  a distal end; and a rotating assembly being cylindrical, being mounted rotatably on the housing, being connected to the connector and having
  an open top end being mounted rotatably around the annular wall of the housing;
  a closed bottom end being connected to the connector;
  a through hole being formed coaxially through the closed bottom end of the rotating assembly and being mounted rotatably around the shaft; and
  a retaining ring being attached securely to the distal end of the shaft rotatably against the closed bottom end of the rotating assembly.

2. The driver as claimed in claim 1, wherein each one of the at least one pawl is implemented with
  a stop protruding in from the inside surface of the annular wall and having a distal edge; and
  an inclined surface connecting to the distal edge of the stop and the inside surface of the annular wall.

3. The driver as claimed in claim 1, wherein the reverse-rotation preventer further has two retaining bars mounted transversely respectively across the limit slots.

4. The driver as claimed in claim 1, wherein
  the connector is implemented as an over load clutch comprising
    a flywheel being formed on the proximal end of the connector adjacent to the central protrusion and having
      a distal end;
      a through hole being formed coaxially through the flywheel, being keyed, corresponding to the shaft and being mounted securely around the shaft; and
      a contact surface being formed on the distal end of the flywheel and having multiple obtuse teeth being formed on the contact surface radially around the through hole and protruding slightly from the contact surface;
    a clutch plate being mounted rotatably around the shaft adjacent to the flywheel, abutting and engaging the flywheel and having
      a proximal end;
      a distal end;
      a through hole being circular, being formed coaxially through the clutch plate and being mounted rotatably around the shaft;
      a contact surface being formed on the proximal end of the clutch plate, corresponding to, abutting and engaging the contact surface on the flywheel and having multiple obtuse teeth formed on the contact surface radially around the through hole, protruding slightly from the contact surface and engaging the obtuse teeth on the contact surface of the flywheel; and
      multiple guide rails being formed longitudinally around and protruding radially from the clutch plate; and
    a spring being mounted around the shaft against the distal end of the clutch plate, pressing the clutch plate against the flywheel and having
      an inner end abutting the distal end of the clutch plate; and
      an outer end; and
  the rotating assembly further has
    a recess being formed concentrically in the closed bottom end of the rotating assembly, being mounted around the shaft, the clutch plate and the spring, abutting the outer end of the spring and having
      a sidewall; and
      a bottom surface abutting the outer end of the spring; and
    multiple guide slots being formed longitudinally in the sidewall of the recess and corresponding respectively to and slidably holding the guide rails to connect the overload clutch to the rotating assembly.

5. The driver as claimed in claim 1, wherein the retaining ring comprises a collar and a setscrew.

6. The driver as claimed in claim 2, wherein the inclined surface of each one of the at least one pawl is slightly concave.

* * * * *